United States Patent [19]

Bumpers

[11] Patent Number: 4,698,156
[45] Date of Patent: Oct. 6, 1987

[54] ROTATING FILTER APPARATUS FOR SEPARATING FINE PARTICLES OF SOLIDS FROM A LIQUID

[75] Inventor: Norman R. Bumpers, Pearland, Tex.

[73] Assignee: MicroSpun Technologies Inc., Houston, Tex.

[21] Appl. No.: 847,753

[22] Filed: Apr. 3, 1986

[51] Int. Cl.$^4$ ............................................... B01D 33/22
[52] U.S. Cl. ................................ 210/331; 210/333.01; 210/360.1; 210/373; 210/412
[58] Field of Search ................. 210/360.1, 360.2, 787, 210/788, 789, 107, 108, 380.1, 391, 330, 393, 331, 411, 333.01, 412, 340, 393, 411, 412, 409

[56] References Cited

U.S. PATENT DOCUMENTS 3,997,447  12/1976  Breton et al. ....................... 210/360

FOREIGN PATENT DOCUMENTS 615953  1/1961  Italy ................................ 210/360.2

Primary Examiner—Frank Sever
Attorney, Agent, or Firm—Vaden, Eickenroht, Thompson, & Boulware

[57] ABSTRACT

A rotating filter apparatus is disclosed having a stack of sintered filter discs mounted on a vertical, rotatable hollow shaft and located within a chamber, the shaft having a plurality of radial openings therein to the hollow bore of the shaft. Unfiltered fluid is introduced under pressure to a tangential entry port in the same direction as disc rotation. The shaft is rotated at a speed sufficient to create a water boundry on the surface to aid the filtering of particles. The clean filtered fluid flows inwardly through the discs and down through the shaft, while the unfiltered fluid and the solid particles, or sludge materials, descend in the chamber to the bottom of a concentration chamber, which includes inwardly slanted sidewalls. The free-flowing sludge flows out of an outlet connection, with the more solid sludge taken out either through a hydrocyclone or a tapered auger connection. The clean fluid is taken out of a discharge chamber surrounding the bottom of the shaft, the bottom of the shaft being angularly slotted to create a suction on the shaft at this location. Cartridge seals provide mounting for the shaft and periodic back pulsing is provided to dislodge lodged particles from the discs.

38 Claims, 6 Drawing Figures

ROTATING FILTER APPARATUS FOR SEPARATING FINE PARTICLES OF SOLIDS FROM A LIQUID

BACKGROUND OF THE INVENTION

1. Field of the Invention

This invention pertains to filter apparatus and more particularly to rotating filter apparatus for separating fine particles of solids from a liquid.

2. Description of the Prior Art

Filters traditionally employ a filter medium through which a fluid having solid particulates suspended therein is passed, leaving the particulates filtered out and permitting the filtered fluids to flow forward. Alternatively to a flowing fluid, filters can be passed through the fluid to remove the filtered particles by a screening operation.

Using either of such methods, it has long been believed that in order to filter out smaller particles, it was necessary to have a filter with smaller openings that blocked out the filtered particles. Hence, as filter mediums improved from screens to other mediums, sintered discs evolved as a preferred medium for filtering out particles of relatively small size, on the order of 75 microns. Such sintered discs comprise a combination of metallic plastic and/or ceramic materials that are held together by compression and/or adhesive or cementitious binding materials. The discs are porous, the opening therethrough for a predetermined thickness being determinable. Hence, down to a certain size of filtered particle it is possible to merely select the disc of proper size and constituent makeup.

However, as needs have arisen for filters having the capability of filtering particles of even smaller size, the limits of the filtering art using the technique of selecting a finer porous medium have been severely tested. The main reason for reaching this limit is the drastic reduction in flow-through rate caused by filters having smaller and smaller filter openings.

It was discovered, however, that it was possible to filter smaller particles than represented by the openings in a sintered disc by rotating the disc as the fluid passed through them. This is believed to be caused by a phenomena characterized as creating a "boundary" layer that builds up on such a rotating disc when the disc is rotated in a fluid.

A stream of fluid moving in a predominant direction at a speed less than that which causes turbulence to occur is believed to flow in established layers. When flowing in a confined channel, the layers next to the walls of the chamber do not flow as fast as the layers flowing in the center of the stream because of the surface tension of the channel walls with the adjacent layer. The layer next to a wall moves the slowest of the layers, the center layer moves the fastest and the layers between move progressively faster within these two extremes as they are established between the layer next to the channel wall and the center layer. The layer or layers next to the channel wall form the "boundary".

When a filter disc is rotated in a fluid, the relative rotation of the disc in the fluid creates a boundary of the type described. Actually, the boundary layer next to the surface of the disc moves faster, than the fluid at some distance therefrom, but it is closer in speed to the wall than further away and, hence, the creation of the boundary. The rotation or the spinning of the disc does cause the fluid to circulate because of the respective surface tension attraction of the fluid layers, but the layer closest to being the same speed of the disc is obviously the adjacent layer thereto.

When a particle moving in the fluid angles toward the porous surface of the disc it would be expected to pass through if such particle was of a size less than that of the opening. However, it has been observed that in the presence of an established boundary layer, particles of about 50% less in size than the opening are repulsed. That is, such particles bounce off the layer. In time, all particles that do not pass through the disc filter progress out by centrifugal force and once free of circulatory motion, descend through the fluid beyond the edge of the disc to the bottom of the fluid chamber.

When the rotation of the disc is too slow, then the boundary layer or layers becomes too thick and it is not a layer at all. This fluid acts as substantially still fluid. In such case, the boundary rejection phenomena just described is not at work. A round disc rotates at different surface speeds of rotation at different radii from the center. The speed is relatively slow near its center and is relatively fast near its periphery. Hence, when the speed of rotation is too slow to establish a boundary, the boundary disappears first toward the center. As the disc slows down, it loses its boundary further and further out from the center until the boundary finally disappears at the periphery.

Although possibly not appreciating the preferred speed of rotation to accomplish filtering utilizing the boundary layer phenomena, Ernest J. Breton did discover that there was a filtering advantage of rotating discs, as revealed in U.S. Pat. No. 3,997,447, issued Dec. 14, 1976 and entitled "Fluid Processing Apparatus". In the system described in his patent, a rotatable hollow shaft is placed into the fluid to be filtered, the shaft having attached to it a rotatable manifold to draw the filtered fluid off and stacked rotatable sintered discs secured to the hollow shaft. The shaft is open to both outlet manifold and to the filtering discs. A pressure gradient is created by a suction at the output. Hence, the filtered particles are removed by rotating discs. The fluid is back pulsed periodically to remove the stuck particles which have plugged the surfaces of the discs.

It should be noted that Breton does not reveal a mechanism by which fluid is introduced to the vessel in which the Breton apparatus operates. The removal of the filtered particles is not specified. The filter disc assemblies are securely attached to the surface of the hollow shaft at the point of the discs. The pressure differential is established by a suction at the fluid outlet. Back pulsing is periodic.

Although the Breton apparatus included many suitable features, it is abundantly demonstrable that the long existence of the publication of the Breton patent without commercialization indicates that improvements needed discovery to make the concept commercially acceptable.

Therefore, it is a feature of the present invention to provide an improved rotary filter apparatus in which the fluid to be filtered is introduced into the chamber housing tangentially to the rotating mechanism to strikingly provide an improved particle separation result.

It is another feature of the present invention to provide an improved rotating filter apparatus in which the particles separated in the filtering process are removed from the chamber without interfering with filter operation.

It is still another feature of the present invention to provide an improved back pulsing system for operation with a rotating filter that does not interfere with the basic -filtering operation.

It is yet another feature of the present invention to provide an improved procedure of establishing a pressure differential across a rotating filter compatible with solid particles removal as well as clean fluid removal.

SUMMARY OF THE INVENTION

The rotating filter apparatus disclosed herein includes a hollow rotatable vertical shaft having a plurality of openings therealong. A plurality of spaced-apart filter discs are attached to the shaft preferably only at the extremes of the shaft within the chamber in which the rotating filter operates. Unfiltered fluid is introduced under pressure into the chamber through a tangential entry port near the top of the chamber, the direction being in the same direction as the rotating direction for the discs. The speed of rotation of the discs is set at a rate sufficient to keep the faces of the discs substantially free from particle adherence buildup. The filtered particles are repulsed by the filtering action of the discs and the fluid boundary established along their faces, the particles being circulated outwardly until they descend to the bottom of the chamber. The required rotational speed to accomplish satisfactory filtering varies with the viscosity of the liquid being filtered The chamber is divided into three vertically related portions, viz., the main chamber portion of general cylindrical configuration at the top, the concentration chamber portion having a general funnel or inverted bell-shape appearance in the middle, and a discharge chamber portion below, but separated from, the concentration chamber portion except through the shaft. The separated solids accumulate in the concentration chamber and are removed therefrom through a side opening, either by way of a hydrocyclone or by an auger. In the event of an auger, the depth of the pitch between flights increases progressively toward a venturi outlet, the solids being compacted and squeezed out.

Pressure differential is provided across the filter by the pumping action of the unfiltered fluid into the chamber. In addition, the hollow shaft is slotted at its lower end in the discharge chamber in such a way that the fluid therefrom is sucked out of the shaft as it is turned. The clean fluid is then discharged from an appropriate outlet in the discharge chamber.

The discharge outlet through which the filtered fluid travels is then connected to an accumulator or reservoir, which is part of a back-pulsing system. Back-pulsing is provided for cleaning the discs and is controlled either by a timer or by measuring the pressure buildup in the chamber caused by partially clogged filter discs. Back-pulsing is actuated by applying a pulse of compressed air to the accumulator, which causes a pulse to carry back in the fluid to unclog the filtered discs.

The shaft is mounted for rotation and held by appropriate rotary seals above the top cover or lid of the main chamber, at a location between the concentration chamber and the discharge chamber and below the discharge chamber. Each of the three rotary seals are preferably suitable cartridge seals and are flushed with clean filtered fluid from the discharge outlet. Appropriate valving temporarily removes the pumping action of the unfiltered fluid and the flushing fluid from the seals during back pulsing.

The shaft is conveniently made up of three sections. The top portion or section provides a top guide and passes up through the top cover and rotary seal. The main part or section of the shaft is located in the main chamber and the concentration chamber. The bottom part or section of the shaft passes through an opening between the concentration chamber to the discharge chamber and through the discharge chamber for attachment to rotary drive means. The three parts allow easy removal of portions of the shaft for cleaning purposes without complete disassembly of the entire apparatus, particularly of the main chamber portion which supports the stacked discs.

BRIEF DESCRIPTION OF THE DRAWINGS

So that the manner in which the above-received features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the drawings.

DESCRIPTION OF THE PREFERRED EMBODIMENTS

Figure 1:
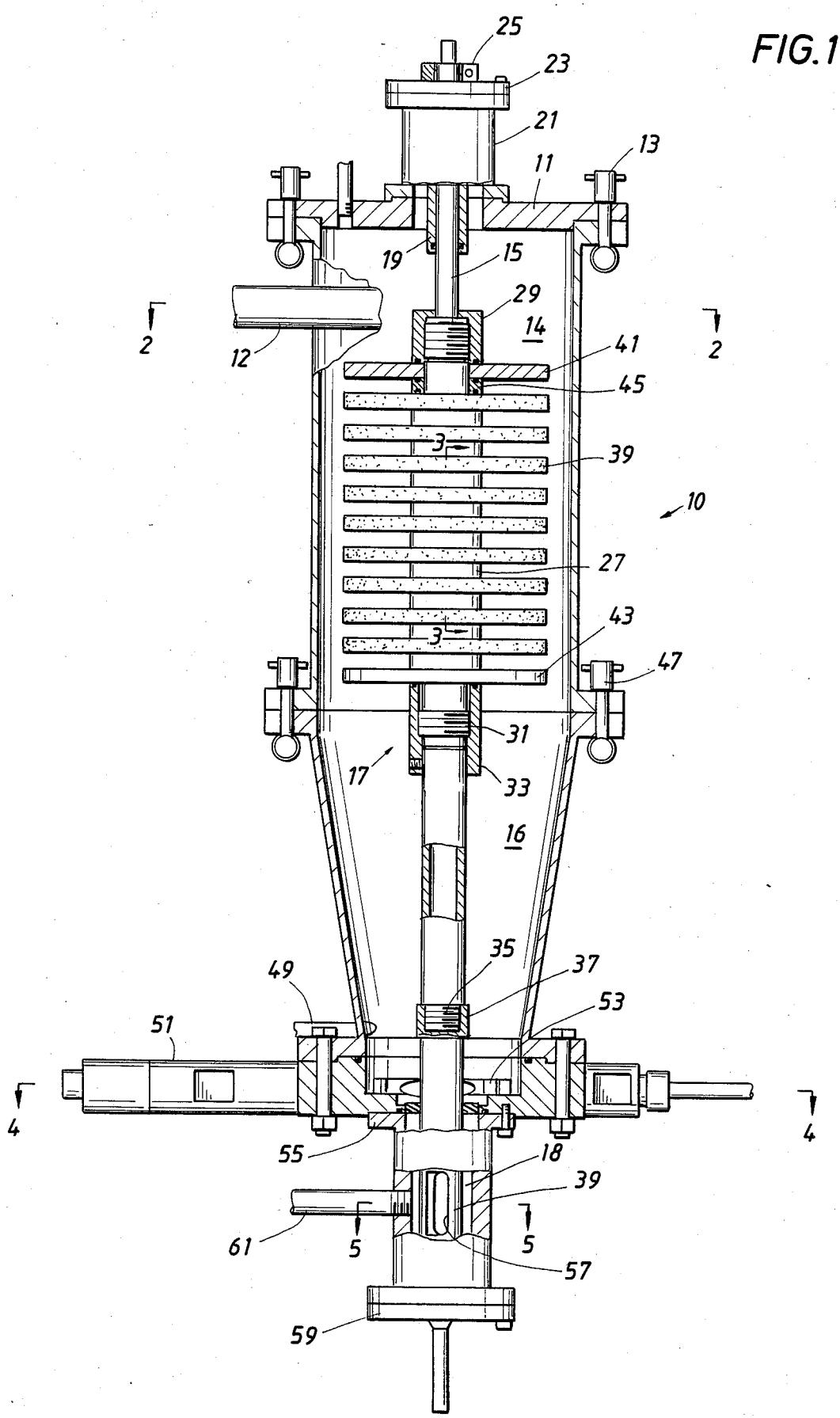
FIG. 1 is a vertical cross-sectional view of a preferred embodiment of the filter apparatus in accordance with the present invention.

Now referring to the drawings and first to FIG. 1, a preferred embodiment of filter apparatus 10 is illustrated and includes a main chamber 14, a concentration chamber 16 and a discharge chamber 18. The main chamber is generally cylindrical with vertical sidewalls and is connected to lid 11 via quick opening clamps 13 operating with respect to an appropriate flange around the top of the main chamber. The lid has a central opening therethrough for allowing top section 15 of the rotatable shaft 17 to pass through. A single rotary cartridge seal 21 is bolted onto the top of lid 11 and provides the bearing and guide surface to permit rotation of the shaft. A suitable cartridge seal for this purpose is model Garlock Turbo Star I seal. The top section of the shaft is protected by sleeve 19 firmly secured thereto. The cartridge seal then operates with respect to the sleeve. The cartridge seal is held in place by bearing retainer 23 bolted to the cartridge seal and finally by drive collar 25.

Figure 3:
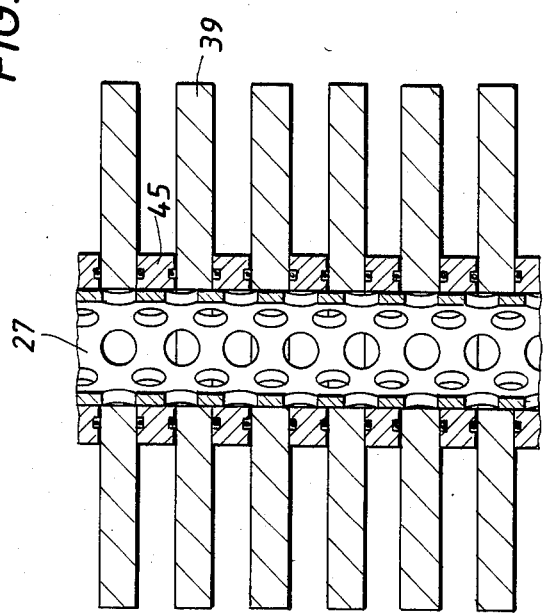
FIG. 3 is a cross-sectional view taken at 3—3 of FIG. 1.
Figure 2:
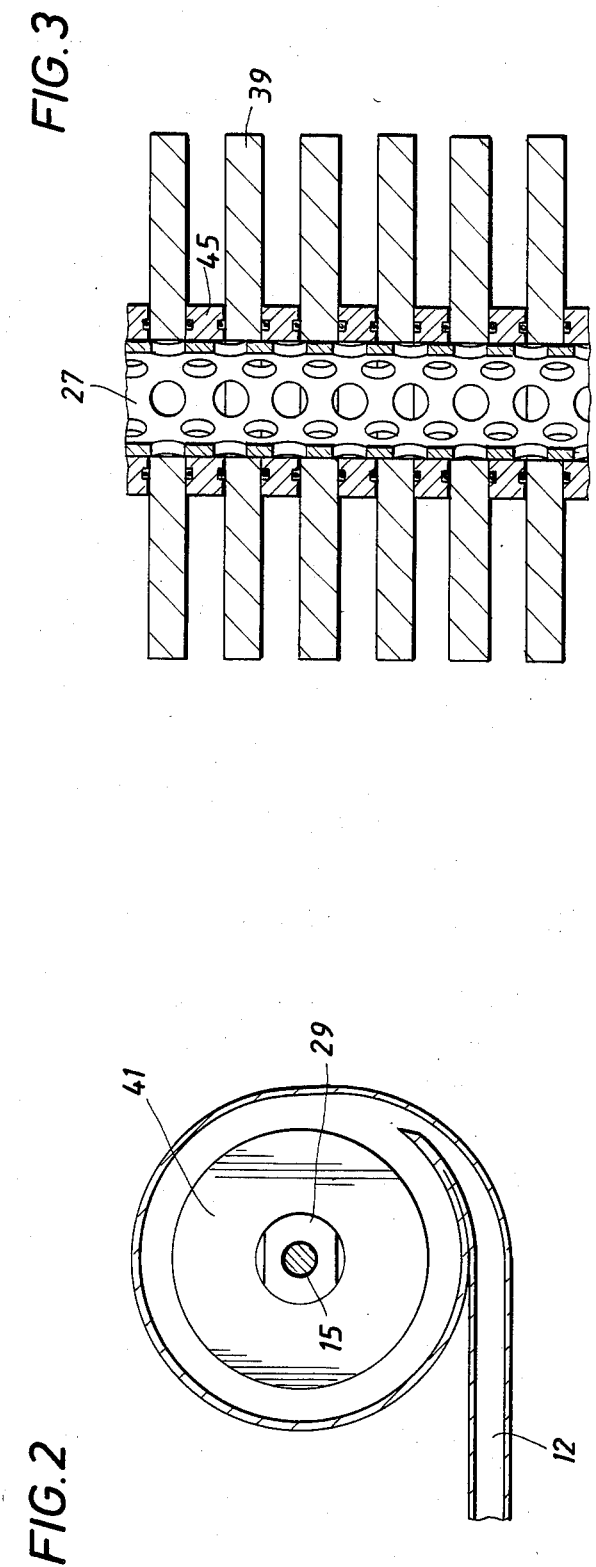
FIG. 2 is a cross-sectional view taken at 2—2 of FIG. 1.

The main or mid section 27 of shaft 17 is hollow and is located partly in main chamber 17 and partly in concentration chamber 16. The top end of main section 27 is internally threaded to accept the externally threaded end of top shaft section 15 and the top end of section 27 is externally threaded to permit a nut cap 29 to be screwed thereover to hold the discs on the shaft in a manner more fully explained below. The upper segment of the main shaft includes a plurality of radial openings to the bore of the shaft (these openings being shown in FIG. 3, but not FIG. 1) and a set of external threads 31 at a location which is about at the lower end of the main chamber when the entire shaft assembly is installed in the apparatus. The openings are in an even pattern about the segment of the shaft section where they are located. Threads 31 accommodate an adjustment cap nut 33 for purposes of adjusting the position of the lowest disc in the disc stack, as hereinafter explained. The lower end of the main shaft section is externally threaded at threads 35 to accommodate the internally threaded end 37 of lower shaft section 39.

An entry port is provided near the upper end of main chamber 14 to provide tangential entry of the unfiltered fluid into the chamber in the same direction as shaft 17 and the discs mounted thereon are rotated, as explained below.

Now referring to the disc structure, it will be seen that discs 39 of finely sintered materials are located in the top segment of shaft 27 where the openings are located. A preferred embodiment of the disc is disclosed in U.S. Pat. No. 3,997,447, Breton issued Dec. 14, 1976, which is incorporated herein by reference for all purposes. The pores of the discs are typically within a range of from about 0.25 to 200 microns. Top disc 41 and bottom disc 43 are not of sintered filter material, but are solid discs. Ring spacers 45 are located between the respective discs and have slightly larger internal diameter openings therethrough than the external diameter of the main shaft portion. Hence, filtered fluid flowing through the discs can flow along the outside surface of the shaft prior to entering one of the openings therein. That is, the spacers do not block any of these openings.

Concentration chamber 16 is connected to main chamber 14 via quick opening clamps 47 at the flanges of the two chambers in the manner that the main chamber is attached to lid 11. The lower part of main shaft section 27 is located in this concentration chamber. It is hollow, but does not have any radial openings therein. Hence, the filtered fluid flowing in the shaft flows through the concentration chamber.

Figure 4:
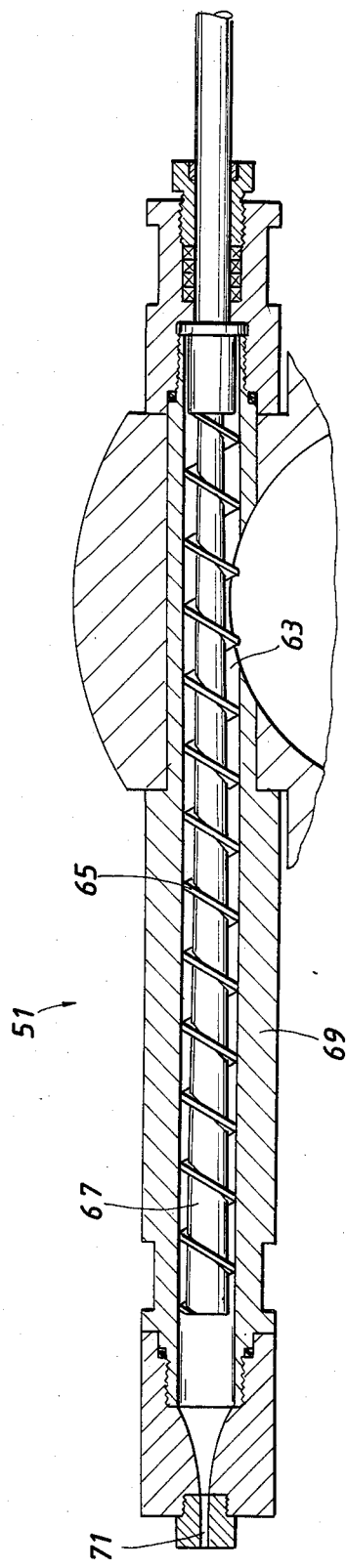
FIG. 4 is a cross-sectional view taken at 4—4 of FIG. 1.

An external connection 49 is made near the bottom end of the concentration chamber to permit the remaining unfiltered fluid in the chamber and the particulates suspended therein to pass from the chamber. This connection, or a plurality of such connections of the same type (not shown in FIG. 1) can be provided to permit connection to a hydrocyclone, if desired. Such a device assists in the removal of such unfiltered fluid and even of the more solid residue or sludge materials that descend to the very bottom of the concentration chamber. Alternatively, or in addition, an auger 51 can be provided, which is explained more fully in association with the description of FIG. 4. Hence, the more freely-moving liquid sludge flows from connection 49 and the more settled particles are taken off by hydrocyclone or auger action.

As can be seen from FIG. 1, concentration chamber has tapered side walls so that the solid materials accumulate in a small area near its bottom. The chamber becomes cylindrical below connection 49.

Figure 5:
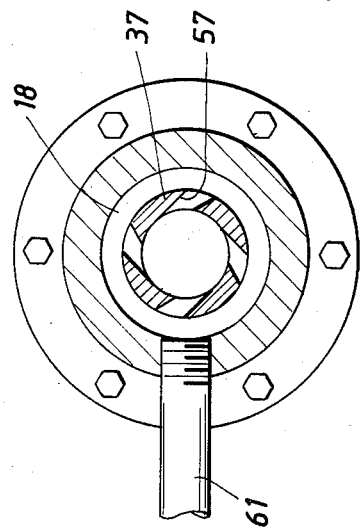
FIG. 5 is a cross-sectional view taken at 5—5 of FIG. 1.

The top part of bottom section 37 of shaft 17 is hollow and includes a top end internally threaded for attaching over threads 35 at the bottom end of main shaft section 27. The top part of this shaft section is supported by double cartridge seal 55, which can be a model Garlock Turbo Star II. The shaft includes a plurality of elongate slots 57 illustrated more fully in FIG. 5 which opens up into discharge chamber 18. The slots are elongated parallel to the shaft and are cut at an angle opposite to the shaft rotation direction, for a purpose more fully explained below. The bottom segment of the shaft is solid and is supported for rotation by a single cartridge seal 59, which is similar to top cartridge seal 21. A connection 61 provides an outlet for the clean or filtered fluid flowing from discharge chamber 18.

In operation of the filter apparatus just described, shaft 17 is rotated by a controllable drive means (not shown) well known in the art at a speed which is compatible with the viscosity of the fluid and the amount of particulates suspended therein. As mentioned above, the speed should be sufficient to establish the boundary effect previously described. This places the shaft rotation speed in the range between 250–5000 rpm for a disc size in a range of sizes from 4 to 36 inches in diameter. The illustrated embodiment shows that the direction of rotation is counterclockwise when viewed from the top.

The fluid particulates suspended therein is introduced under pressure via entry port 12, which is a tangential port designed to cause the entering fluid to be in the same direction as the rotation of shaft 17. The tangential entry minimizes turbulence in the chamber and achieves a movement of the fluid in a direction that efficiently assists in the creation of a fluid boundary on the surface of the discs since it aids in the fluid rapidly getting up to speed.

The exit connection of the apparatus is not under pressure (actually, it is under a slight vacuum) and, therefore, the fluid that circulates around and between the discs flows through the discs and into the openings of the shaft in the disc area. Particles are repelled by the top disc and the bottom disc and by the filtered discs if they are larger than the size that are capable of passing through the filter porous openings and the boundary established as described above. The clean fluid flows down through the shaft. The remaining unfiltered fluid and particles circulate and descends downward in main chamber 14 and through concentration chamber 16 to flow out of connection 49 or to settle and be removed by hydrocyclone or auger removal action.

Auger 51 can be used to remove the solids. The auger operates with respect to a side opening 63. Flights 65 are evenly spaced; however, the dimension of the shaft 67 of the auger gradually becomes larger and larger toward the exist end of housing 69. Housing 69 has a uniform internal opening 69 only slightly larger than the external diameter of the flights. In other words, the depth of the pitch between the flights increases toward the exit end of the auger. Hence, as the auger is turned, the sludge removed by the auger is advanced toward its output end, the solid is compacted while the moisture therefrom is squeezed out at the same time.

The end of housing 69 is connected to a venturi opening 71, which causes the solids to be extruded out. The opening also results in a vacuum pull or suction on the end of the housing, assisting in the removal of the sludge. The auger shaft can be rotated either mechanically or manually, as desired.

The bottom portion of lower shaft section 37 which is located in the discharge chamber 18 is slotted at slots 57. The slots are not radial openings, but, as mentioned above, are angled in a direction opposite to the direction of rotation. Such slotting causes the fluid in the hollow center of the shaft to be sucked or drawn out by a vacuum pull created by the slotting. Hence, this helps maintain the flow of the clean fluid from the filter shaft and subsequently out of connection 61.

In order to disassemble the apparatus for cleaning purposes or for the purpose of replacing discs or other parts only that portion of the apparatus requiring access is disconnected from the other parts. For example, lid 11 can be quickly disconnected from the main chamber by using quick opening clamps 13. The main chamber can be disconnected quickly from the concentration chamber in a similar manner using clamps 47. The sections of the shaft can be disconnected from each other by unscrewing their respective ends. Cap nuts 29 and 31 allow the exact compression holding force on the entire disc stack and interim ring spacers which are held as a unit and not through individual connection. It should be noted that the exact position of lower disc 43 is adjustable using nut 31 and the holding pressure on stack is achieved by the tightening of nut 29.

A planetary ring 53 can be located in the cylindrical lower part of concentration chamber 16, if desired. Such a ring "floats" freely within the bottom of the chamber and is dimensioned so that its outside diameter is nearly the same as the internal diameter of the cylinder portion of the chamber. A plurality of internally directed radial tabs attached to the inside of the ring provides the surfaces that cause the ring to rotate with the circular motion of the fluid. The fluid, of course, rotates with the rotation of the shaft and the stack of discs. The rotation of the ring keeps the particles that descend to the bottom of concentration chamber stirred up and in suspension so that they do not pack or cake together, but are removed as described above.

Figure 6:
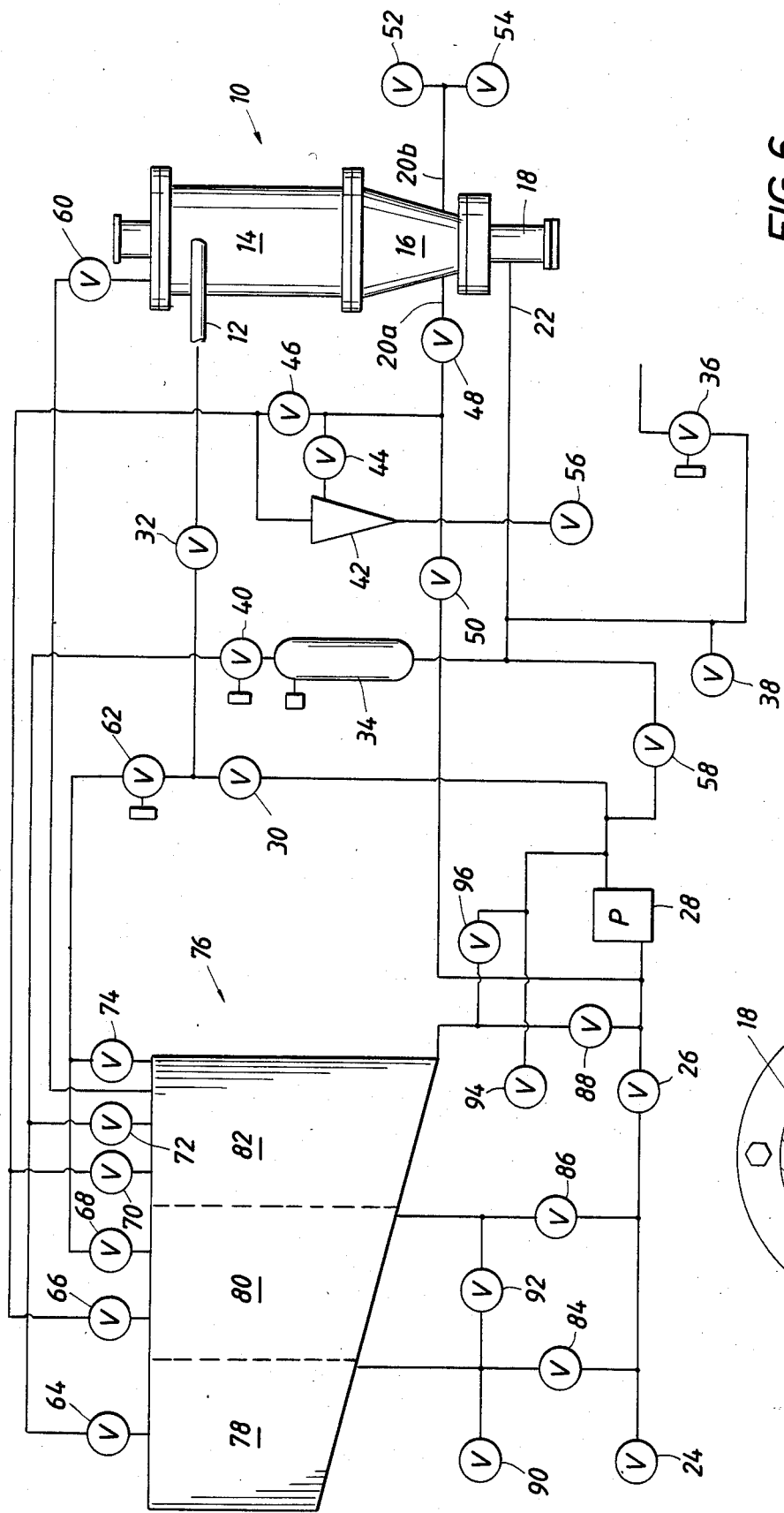
FIG. 6 is a plumbing diagram of the fluid and air connections to the filter apparatus shown in FIG. 1.

FIG. 6 illustrates a suitable plumbing or piping diagram of a system utilizing the filter apparatus described above. The system includes many valves that may not be present in a system established to operate in a limited number of operating modes, but they are illustrated in FIG. 6 to provide a system having a variety of possible operating modes. For convenience, the system shown in FIG. 6 can be conveniently mounted on a common skid, if desired.

Filter apparatus 10 receives the unfiltered fluid at tangential entry port 12 connected near the top of its main chamber 14. The filtered particulates along with residue fluid leaves concentration chamber 16 at exit ports 20a and 20b near its bottom. Parts 20a and 20b are equivalent to exit connection 49 shown in FIG. 1. Filtered or clear fluid leaves discharge chamber 18 via port 22.

Returning to the unfiltered fluid connections, unfiltered fluid enters through input valve 24 and passes through valve 26 to the input or suction side of pump 28, which pumps the unfiltered fluid under pressure through valves 30 and 32 into entry port 12.

The clean fluid from discharge chamber 18 flows from the chamber through control outlet valve 36. A portion of the fluid is directed to accumulator 34, which stores a quantity of fluid for two purposes: (1) flushing the rotary cartridge seals and (2) back-pulsing the system. A connection is made through control valve 36 to the input side of the three cartridge rotary seals (which connection is not shown). The return connection from the seals is made via valve 60 to the holding tank 76. Similar returns are connected to each of the other rotary seals.

Holding tank 76 is shown in three separate and convenient sections 78, 80 and 82 which provide the ability to store unfiltered, filtered, and dirty discharged fluids from apparatus 10 for any convenient purpose and to add cleaning solvent or other additive, if desired. The tank is illustrated as having a slanted bottom so that the drain connections to each of the respective sections will accept the solids that settle in these sections whenever the drains are opened in operation.

The filtered or clean fluid leaves the system at valve 38.

Now turning to the sludge connections, an external outlet is taken at connection 20b through valves 52 and 54, which, in turn, can be connected to other hydrocyclones. The connection at 20a is to valve 48, which is connected to hydrocyclone 42 via valve 44. The solids are allowed to settle and are removed from the hydrocyclone via valve 56. The fluid overflow from the hydrocyclone returns to holding tank 76 via valves 66 and 70. Valve 46 allows some or all of the fluid to the hydrocyclone just described to be bypassed therearound, if desired.

A connection of the sludge fluid is also made to the input side of pump 28 via valve 50, when desired.

When the filter discs in the filter apparatus become partly clogged with the filtered particulates, the system is back-pulsed using the clean fluid in accumulator 34. The pressure in the apparatus can be monitored for this purpose or a clock can periodically actuate an air compressor connected to accumulator 34. Typical back pulsing occurs once each minute and lasts for 3.5 seconds, although the timing and frequency of back pulsings is not particularly critical. When this occurs, valve 36 is temporarily closed to prevent increasing pressure on the fluid connections to the seals, valve 40 is temporarily closed to prevent blowing a pulse of air back into the tank, and normally closed valve 62 is opened to relieve the positive pressure normally applied to the tank via entry port 12. The back-pulsing is under enough pressure so as to cause the dislodging of lodged particles from the surface of the filter discs.

The valves that are arranged on the input and output sides of the tank sections provide means for selectably inputting and outputting the tank sections. Valves 66 and 70 have already been mentioned as appropriate valves for the overflow or bypassed fluid from hydrocyclone to sections 80 and 82, respectively. In addition, valves 68 and 74 are the respective valves to these sections for the back-pulses fluid or backwashed fluid through valve 62. Also, the valves can be used to transfer fluid as directed through pump 28 and 30, as desired. Valves 64 and 72 are the input valves to tank sections 78 and 82, respectively, for the clean fluid from accumulator 34 via valve 40.

Section 78 is gravity drained, when desired, via valve 90; section 80 is gravity drained via valves 92 and 90; and section 82 is gravity drained via valves 96 and 94. Valve 94 also permits the pump to have a direct outlet, when desired.

The respective pump feed valves for tank sections 78, 80 and 82, respectively, are valves 84, 86 and 88. It should be noted that fluid can be transferred from section to section, if desired, using the appropriate pump feed valve and input valve via the valving that is provided.

Finally, when it is desired to thoroughly back filter apparatus 10, usually with appropriate cleaning solvent, valve 58 provides a suitable passage from pump 28 to port 22 connected to discharge chamber 18.

As previously mentioned, the particular valving arrangement shown in FIG. 6 is exemplary only. Apparatus 10 can be operated in conjunction with any suitable auxiliary components.

While preferred embodiments of the invention have been shown and described, it will be understood that the invention is not limited thereto since many modifications may be made and will become apparent to those skilled in the art.

What is claimed is:

1. Rotating filter apparatus for separating suspended fine particles of solids from a liquid, comprising:
   a chamber,
   a hollow, rotatable vertical shaft located within said chamber and having a plurality of small openings therealong,
   a plurality of stacked porous discs surrounding said shaft and connected thereto for rotation at at least one point,
   a plurality of fluid impervious annular spacers surrounding said shaft, one of said spacers respectfully located between and spacing apart said respectively stacked discs,
   said chamber including a tangential entry port for the inputting of the unfiltered solids and liquid under pressure,
   said hollow shaft including an exit port for the discharge of the filtered liquid positioned sufficiently below said entry port to to cause said fine particles to fall out of suspension,
   means for removing the collected filtered solids from said chamber, and
   means for rotating said shaft in the same direction as the direction of entry for said unfiltered solids and liquid at a sufficient speed to prevent solid particle accumulation on at least a substantial portion of the surfaces of said stacked discs.

2. Rotating filter apparatus in accordance with claim 1, wherein said tangential entry port is near the top of said chamber.

3. Rotating filter apparatus in accordance with claim 1, and including
   a discharge chamber for receiving the liquid filter from said hollow shaft exit port, said discharge chamber including a filtrate outlet, and
   a back-pressure source connected to at least one of said entry port and filtrate outlet for periodically back-pulsing said stacked porous discs.

4. Rotating filter apparatus in accordance with claim 3, wherein said back-pressure source includes an accumulator connected to receive filtered liquid from the rotating filter apparatus, said filtered liquid in said accumulator being used in back-pulsing said stacked porous discs.

5. Rotating filter apparatus in accordance with claim 4, and including
   rotatable seal means for preventing leakage from said chamber,
   said seal means being flushed with filtered liquid from the rotating filter apparatus, and
   valving means for disconnecting the filtered liquid from flushing said seal means during said periodic back-pulsing of said stacked porous discs.

6. Rotating filter apparatus in accordance with claim 3, and including timing means connected to said back-pressure source for back-pulsing said stacked porous discs at timed intervals.

7. Rotating filter apparatus in accordance with claim 3, and including pressure-differential sensing means for sensing the pressure differential within said chamber and connected to activate said back-pressure source to back pulse said stacked porous discs when said pressure differential rises above a predetermined level.

8. Rotating filter apparatus in accordance with claim 1, and including a high pressure source for inputting the unfiltered solids and liquid connected to said entry port.

9. Rotating filter apparatus in accordance with claim 8, wherein said high pressure source produces a pressure in the range of about 60 to 500 psi.

10. Rotating filter apparatus in accordance with claim 1, and including valving means for removing the application of pressure differential to said chamber during the back-pulsing of said stacked porous discs.

11. Rotating filter apparatus in accordance with claim 1, and including a solid disc at the top of said stacked porous discs.

12. Rotating filter apparatus in accordance with claim 11, and including a solid disc at the bottom of said stacked porous discs.

13. Rotating filter apparatus in accordance with claim 1, wherein said chamber includes a side opening on its bottom and said filtered solids removing means includes an auger operating through said side opening.

14. Rotating filter apparatus in accordance with claim 1, wherein said chamber includes a main chamber with vertical side walls and having a cylindrical body and a lower concentration chamber attached to said main chamber having tapered side walls merging to a smaller dimension than the inside diameter of said main chamber.

15. Rotating filter apparatus in accordance with claim 14, wherein said concentration chamber has a flat, horizontal bottom, and including a planetary ring rotated on said bottom by the movement of the solids and liquid within said concentration chamber to keep the solids from compacting.

16. Rotating filter apparatus in accordance with claim 14, and including a discharge chamber separated from and located below said concentration chamber, said hollow shaft exit port opening into said discharge chamber, said discharge chamber including a filtrate outlet.

17. Rotating filter apparatus in accordance with claim 16, wherein said hollow shaft exit port includes one or more side slots for creating a pressure suction to help draw the filtered liquid from said shaft.

18. Rotating filter apparatus in accordance with claim 17, wherein each of said slots opens outwardly from the hollow opening of said shaft and in a direction predominantly angled opposing the direction of rotation of said shaft.

19. Rotating filter apparatus in accordance with claim 16, wherein the lower portion of said hollow shaft located in said discharge chamber is disconnectable from the hollow shaft included in said main chamber.

20. Rotating filter apparatus in accordance with claim 19, wherein an upper portion of said shaft is disconnectable from the hollow shaft included in said main chamber, said shaft being centrally rotatably held in a rotatable seal above and outside of said main chamber.

21. Rotating filter apparatus in accordance with claim 20, wherein the root diameter between the flights of said auger progressively increases toward its output end to compact the filtered solids as they are removed.

22. Rotating filter apparatus in accordance with claim 21, and including an output venturi nozzle attached to the output end of said auger.

23. Rotating filter apparatus in accordance with claim 14, wherein said shaft is externally threaded at its lower end and said enlarged shoulder is included in a lower nut adjustable screwed onto the lower end of said shaft to locate the vertical position of the bottom one of said stacked discs.

24. Rotating filter apparatus in accordance with claim 1, wherein said chamber includes a side opening on its bottom and said filtered solids removing means includes a hydrocyclone.

25. Rotating filter apparatus in accordance with claim 24, wherein the overflow of said hydrocyclone is returned to said entry port.

26. Rotating filter apparatus in accordance with claim 1, wherein said shaft includes a disconnect joint below the bottom of said stacked discs within said chamber.

27. Rotating filter apparatus in accordance with claim 1, wherein said shaft presents an enlarged shoulder for supporting the bottom one of said stacked discs, said shaft at the top of said stacked discs includes a threaded portion, and including an enlarged cap nut for tightening with respect to said threaded portion to compressibly hold said stacked discs to said hollow shaft during rotation.

28. Rotating filter apparatus in accordance with claim 1, wherein said chamber includes a sealed top cover having rotary seals, and including means for flushing the seals of said sealed top cover from the filtered liquid discharged from said exit port.

29. Rotating filter apparatus in accordance with claim 28, wherein said chamber includes a lower rotary seal above said exit port of said shaft, said chamber including a discharge chamber portion enclosing said exit port and having a filtrate outlet, said flushing means connected for flushing the seals of said sealed top cover and said lower seal from the filtered liquid from said filtrate outlet.

30. Rotating filter apparatus in accordance with claim 29, wherein said chamber includes a bottom rotary seal below said discharge chamber portion, said flushing means being connected for flushing said bottom seal from the filtered liquid from said filtrate outlet.

31. Rotating filter apparatus in accordance with claim 30, wherein said flushing means includes exhaust connections to said entry port of said chamber.

32. Rotating filter apparatus in accordance with claim 30, wherein said sealed top cover, said lower seal and said bottom seal each include a rotatable cartridge seal.

33. Rotating filter apparatus in accordance with claim 1, wherein said porous discs each comprise a three-layer sandwich of sintered materials, the top and bottom layers being of finer porous material than the center layer.

34. Rotating filter apparatus in accordance with claim 1, wherein the pores of said porous discs are within a range of from about 0.25 to 200 microns, said filter apparatus filtering solid particles from the liquid of about one-half the size of said pores.

35. Rotating filter apparatus in accordance with claim 1, wherein said porous discs are within a size range from 4 to 36 inches in diameter.

36. Rotating filter apparatus in accordance with claim 35, wherein said shaft rotating means rotates said shaft within the range of about 250–5000 rpm.

37. Rotating filter apparatus for separating suspended fine particles of solids from a liquid, comprising:
a chamber,
a hollow, rotatable vertical shaft located within said chamber and having a plurality of small openings therealong,
a plurality of stacked porous discs surrounding said shaft and connected thereto for rotation at at least one point,
a plurality of fluid impervious annular spacers surrounding said shaft, one of said spacers respectfully located between and spacing apart said respectively stacked discs,
said chamber including an entry port for the inputting of the unfiltered solids and liquid,
said hollow shaft including an exit port for
the discharge of the filtered liquid positioned sufficiently below said entry port to cause said fine particles to fall out of suspension,
means for applying said unfiltered solids and liquid under pressure, said entry port being at a higher pressure than said exit port,
said shaft being rotatable at a sufficient speed to prevent solid particle accumulation on at least a substantial portion of the surfaces of said stacked discs,
said chamber including an opening at its bottom, and
means for removing the collected filtered solids from said chamber through said bottom opening.

38. Rotating filter apparatus in accordance with claim 37, wherein
said bottom opening is on the side of said chamber, and
said removing means includes an auger operating through said side opening wherein the root diameter between the flights of said auger progressively increases toward its output end to compact the filtered solids as they are removed.

* * * * *